United States Patent [19]

Goscenski, Jr.

[11] 4,179,888

[45] Dec. 25, 1979

[54] HYDRAULIC FAN DRIVE SYSTEM

[75] Inventor: Edward J. Goscenski, Jr., Battle Creek, Mich.

[73] Assignee: Eaton Corporation, Cleveland, Ohio

[21] Appl. No.: 907,064

[22] Filed: May 18, 1978

[51] Int. Cl.² .................................................. F15B 11/16
[52] U.S. Cl. ........................................ 60/420; 60/456; 60/468; 60/484; 91/419; 123/41.12
[58] Field of Search ................ 60/329, 420, 456, 468, 60/DIG. 5, 484; 91/419; 123/41.12, 41.65

[56] References Cited

U.S. PATENT DOCUMENTS

| | | | |
|---|---|---|---|
| 1,256,709 | 2/1918 | Ludeman | 60/DIG. 5 |
| 2,769,394 | 11/1956 | Lauck | 60/329 X |
| 2,777,287 | 1/1957 | Tweedale | 60/396 |
| 2,948,268 | 8/1960 | Roper et al. | 123/41.11 |
| 3,055,473 | 9/1962 | Oldberg et al. | 192/58 A |
| 3,401,605 | 9/1968 | Born | 91/419 |
| 3,613,645 | 10/1971 | Froumajou | 123/41.46 |
| 3,659,567 | 5/1972 | Murray | 123/41.12 |
| 3,664,129 | 5/1972 | Schwab | 91/419 |
| 4,040,272 | 8/1977 | Boyd | 64/26 |

*Primary Examiner*—Edgar W. Geoghegan

*Attorney, Agent, or Firm*—R. J. McCloskey; J. Yakimow; L. Kasper

[57] ABSTRACT

A vehicle engine accessory drive system is disclosed including a hydraulic fan motor and a power steering gear mechanism in series flow relationship. The vehicle power steering pump is the sole source of fluid for the system and has its flow control setting at a flow rate X, which is substantially greater than the flow rate Z required by the power steering gear. A temperature responsive bypass valve is connected in parallel across the fan motor and the bypass flow and motor outlet flow recombine, then flow to a steering gear flow control which communicates a flow rate Z to the steering gear mechanism and all fluid in excess of Z bypasses the steering gear, recombining with the output flow from the steering gear and returning to the pump inlet. This system provides a flow to the fan motor resulting in a fan speed-versus-engine speed similar to a "viscous curve". In addition, the system permits simultaneous operation of the fan motor and steering gear without the flow requirement of either one affecting the flow to the other, and with the pressure requirements being complementary, i.e., the pressure drop across the fan motor is at a minimum when the steering load is at a maximum.

12 Claims, 12 Drawing Figures

HYDRAULIC FAN DRIVE SYSTEM

BACKGROUND OF THE DISCLOSURE

The present invention relates to hydraulic systems for driving the radiator cooling fans of vehicle engines, and more particularly, to such systems for use in vehicles in which the engines are oriented transversely.

Although it will become apparent from the subsequent description that the present invention has many uses and application, it is especially advantageous when used to drive the radiator cooling fan of a vehicle engine, and will be described in connection therewith.

Originally, radiator cooling fans were driven directly, i.e., by some form of mechanical connection between the fan and the engine crankshaft. For example, the fan was frequently bolted to a flange on a shaft projecting forwardly from the engine water pump, such that the fan speed was either the same as the engine speed, or directly proportional thereto, depending upon the belt and pulley ratios between the crankshaft and the water pump. The proportionality between fan speed and engine speed is desirable at lower engine speeds (e.g., below 3000 rpm), but is undesirable at higher speeds where additional air flow through the radiator becomes unnecessary, wastes engine horsepower and creates excessive noise.

More recently, viscous fan drives have been developed which overcome the above-mentioned problems whereby direct fan drive systems have excessive fan speed at higher engine speeds. Viscous fan drives transmit torque by means of a viscous fluid contained within a shear space defined between an input member and an output member, such that rotation of the input member causes a viscous shear drag to be exerted on the output member, transmitting torque thereto. See U.S. Pat. No. 2,948,268, assigned to the assignee of the present invention. Viscous fan drives of the type shown in the cited patent have an inherent torque-limiting characteristic, such that the fan speed increases roughly proportional to the engine speed, up to a certain engine speed such as 2500 rpm, then the fan speed levels off and remains constant as engine speed and torque continue to rise. The resulting graph of fan speed versus engine speed has become known as a "viscous curve", and it is now generally a requirement of U.S. vehicle manufacturers that any drive system, whether of the viscous type or not, operate in accordance with the well-known "viscous curve".

A further step in the development of viscous fan drives was represented by U.S. Pat. No. 3,055,473, which discloses a viscous fan drive having the same "viscous curve" during its normal operation condition (engaged), but in addition, has the ability to become disengaged in response to ambient air temperature being below a predetermined level, thus providing a substantial saving of engine horsepower when normal operation of the fan is unnecessary for sufficient cooling of the engine.

The actual torque which must be transmitted by the viscous drive from the input to the output, and fan connected thereto, can vary greatly, depending upon factors such as the size of the radiator, size of the fan, weight of the fan, etc. However, fan drive power requirements are normally in the range of about 0.5 to 2.0 hp for four and six cylinder engines and in the range of about 2.0 to about 3.0 hp for eight cylinder engines.

Both of the conventional fan drive arrangements discussed above can be used only with a standard in-line engine, i.e., one having the crankshaft oriented axially. However, in recent years many auto makers, especially in Europe, have elected to use a transverse engine, providing front wheel drive, for reasons which are now well known in the art, and the trend toward transverse engines, especially in the four and six cylinder range, is extending to the U.S. as well. In European transverse engine automobiles, the cooling requirements have generally been met rather easily for various reasons, including the fact that the majority of the vehicles have been used in the generally colder regions, such as the Scandinavian countries. However, the nature of the U.S. automobile market is such that all transverse engine vehicles market in the U.S. will be required to have sufficient cooling capacity to operate satisfactorily under the conditions prevailing in the hot southern regions of the country.

The attempts by those working in the art to provide a satisfactory fan drive system for use with transverse mounted engines has included many different approaches. One approach, which is analogous to the conventional direct fan drive system, is the use of an arrangement of shafts and bevel gears to translate the transverse crankshaft rotation into axial fan shaft rotation. See U.S. Pat. No. 3,613,645.

Another approach has been the use of an electric motor to drive the fan which provides the possibility of some sophistication in the control of fan speed. However, as the fan drive horsepower requirement reaches even the low end of the range indicated previously (0.5 hp), the size and expense of the needed electric motor may become prohibitive.

U.S. Pat. No. 4,040,272, assigned to the assignee of the present invention, illustrates an attempt to provide a transverse engine fan drive system using a device very much like a viscous fan drive having its input driven by the crankshaft and its output connected to one end of a flexible shaft, with the other end of the flexible shaft being connected to the fan. Such an approach has substantial potential, but presents a difficult situation in terms of the life of the shaft, especially on the larger engines having greater fan drive horsepower requirements.

Another major approach to the cooling of transverse engines is the use of hydraulic systems, including a hydraulic pump driven by the engine and a hydraulic motor connected to the fan. It will be appreciated by those skilled in the art of automotive engines and engine accessories that the addition of a complete hydraulic system creates problems relating to space requirements, and undesirably increases both the weight and cost of the vehicle. Accordingly, those attempting to design a satisfactory hydraulic fan drive system have tried to reduce the space, weight, and cost of such systems by utilizing at least one of the hydraulic components in at least two different vehicle hydraulic systems. For example, there have been frequent attempts to utilize the power steering pump to provide pressurized fluid to operate a hydraulic fan motor, as well as the power steering gear (see U.S. Pat. No. 2,777,287). In such systems, inter-action between the fan motor and the other hydraulic actuator (such as the power steering gear) have generally resulted in unsatisfactory performance by the fan motor, or the steering gear, or both.

One design approach to such systems has been to place the fan motor in series with the power steering gear, but upstream therefrom, such that the flow through the fan motor also passes through the steering gear. See U.S. Pat. No. 3,659,567 which will be described in greater detail subsequently. A major drawback of such prior art systems has been a constant flow rate through the fan motor over all engine speeds from idle to maximum, such that fan speed is constant regardless of engine speed. Typically, the result with such a system is that more cooling than is needed is provided at lower engine speeds, thereby wasting engine horsepower, or the cooling may be only marginal at higher engine speeds, or both. In addition, such systems require a relatively high fan motor pressure and pump horsepower at lower engine speeds when the pressure drop across the power steering gear is greatest, thus making it difficult to satisfy the pressure and flow requirement of both the fan and steering system simultaneously.

SUMMARY OF THE INVENTION

Accordingly, it is an object of the present invention to provide a hydraulic fan drive system in which the fan motor operates, as a function of engine speed, in accordance with the desired viscous curve.

It is another object of the present invention to provide a hydraulic fan drive system which receives presurized fluid from the power steering pump and in which the hydraulic fan motor and the power steering gear are more compatible.

The above and other objects of the present invention are accomplished by the provision of an improved vehicle accessory drive system. The system comprises an engine driven pump including a pumping element operable to deliver fluid at a rate generally proportional to engine speed. The pump includes fluid inlet and outlet ports, the pump having a fluid delivery rate of Y at engine idle. The pump comprises the sole source of pressurized fluid for the system and includes first flow control valve means operable to limit the fluid delivery rate from the pump outlet port to a flow rate of X at higher engine speeds, X being substantially greater than Y. The system includes first and second subsystems connected in series flow relationship between the pump outlet port and the pump inlet port. Each of these subsystems include inlet means and outlet means. One of the subsystems includes a hydraulic fan motor and a bypass valve. The hydraulic fan motor has an inlet port communicating with the subsystem inlet means and an outlet port communicating with the subsystem outlet means. The fan motor has a fan speed at engine idle corresponding to a fluid flow rate of approximately Y and a fan peak speed corresponding to a fluid flow rate of approximately X. The bypass valve means is connected in parellel with the fan motor, operable to bypass the fan motor and being responsive to the need for fan operation. The bypass valve means is capable of bypassing at least a major portion of X at a first relatively lower temperature condition and is capable of substantially preventing bypass flow at a second relatively higher temperature condition. The other of the subsystems includes a second flow control valve means and a steering gear mechanism. The second flow control valve means has its inlet in fluid communication with the subsystem inlet means and has primary and secondary fluid outlets. The second flow control valve means is operable to communicate a fluid flow rate of approximately Z from its inlet to the primary fluid outlet over substantially the entire range of operating engine speeds and is operable to communicate substantially all fluid flow in excess of Z from its inlet to the secondary fluid outlet, Z being substantially less than X. The secondary fluid outlet is in fluid communication with the subsystem outlet means. The steering gear mechanism has its inlet port connected to the primary fluid outlet and its outlet port connected to the subsystem outlet means.

DESCRIPTION OF THE PREFERRED EMBODIMENTS

Figure 1:
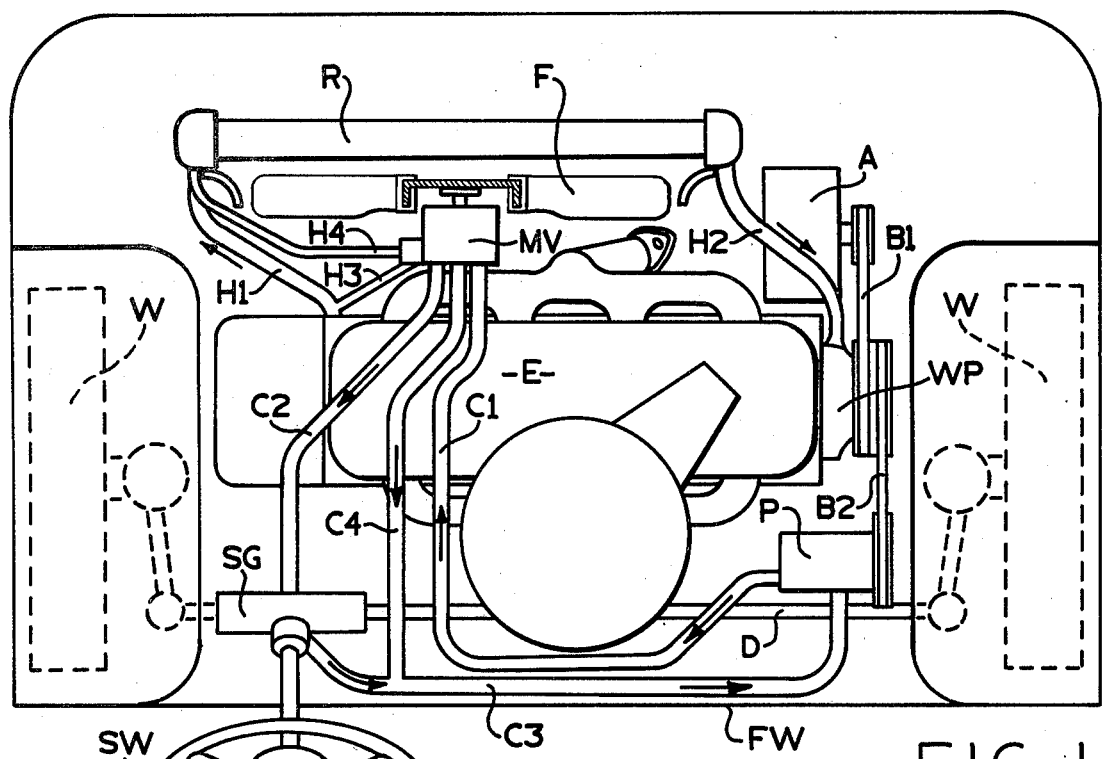
FIG. 1 is a somewhat schematic top plan view of the engine compartment of a vehicle utilizing a hydraulic fan drive system in accordance with the present invention.

Referring now to the drawings, which are not intended to limit the invention, FIG. 1 is a somewhat schematic top plan view of the engine compartment of a vehicle utilizing the present invention. Transversely disposed within the compartment is a vehicle engine E including means (not shown) for transmitting torque to a pair of ground-engaging front wheels W. Disposed adjacent the right-hand end of the engine E and driven thereby is a water pump WP including a pair of pulleys, one of which drives a V-belt B1 which drives the alternator A, and the other of which drives a V-belt B2 which drives a power steering pump P. As is well known in the art, the power steering pump is driven at a speed having a certain, fixed relationship to engine speed, depending upon the ratio of the pulleys which are interconnected by the belt B2.

Disposed adjacent the forward portion of the vehicle engine compartment is a radiator R. A hose H1 communicates relatively hot water from the engine E to the top tank of the radiator R, while a second hose H2 communicates relatively cooler water from the radiator bottom tank to the engine water pump WP.

Situated in its normal location, just ahead of the fire wall FW is an open-center, hydraulic booster-type steering gear mechanism SG of the type commonly used, which is responsive to the rotation of a steering wheel SW to transmit a steering force to a drag link D.

The power steering pump P generates a flow of pressurized fluid which is communicated by means of a conduit C1 to a motor-valve apparatus MV, to which is operably attached a radiator cooling fan F. Some of the fluid leaving the motor-valve apparatus MV is communicated by conduit C2 to the open-center steering gear mechanism SG and from the steering gear SG back to the pump P by means of a conduit C3. Alternatively, as will be described in greater detail subsequently, fluid may flow from the motor-valve apparatus MV by means of a conduit C4 which bypasses the steering gear SG and communicates with the conduit C3.

Figure 2:
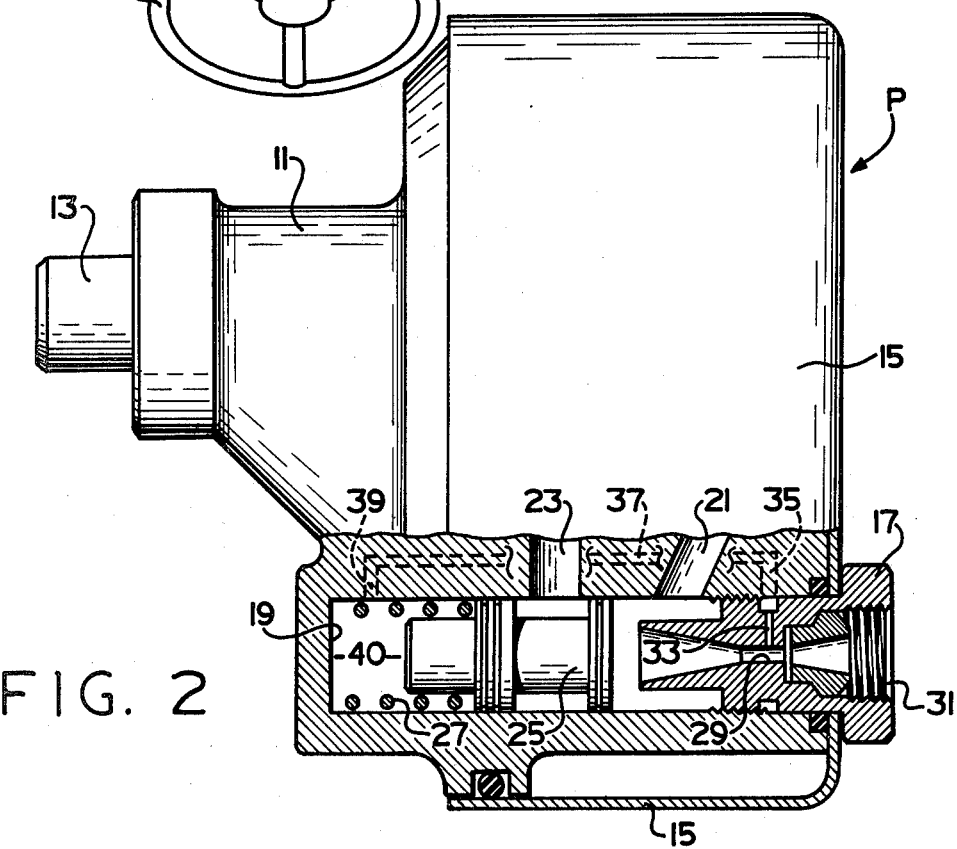
FIG. 2 is a view, partly in elevation, and partly in cross section, of a typical power steering pump of the type which may be used with the present invention.

Referring now to FIG. 2, there is illustrated in greater detail the power steering pump P, which may be of the type well known in the art and therefore, will be described only briefly. The pump includes a housing 11, typically a casting, which defines a pumping chamber (not shown), with a rotatable pumping element (not shown) being disposed therein and driven by an input shaft 13. The pumping elements of automotive power steering pumps are typically of the sliding vane or roller vane type, but it is within the scope of the present invention for the pumping element of the power steering pump P to be of any type which is capable of pumping fluid at a rate generally proportional to the speed of rotation of the shaft 13 (and the engine speed).

The pump P includes a reservoir can 15 which surrounds a portion of the housing 11 and cooperates therewith to define a fluid reservoir. The reservoir can 15 is held fixed relative to the housing 11 by several threaded members (some of which are not shown), including a threaded orifice member 17, which will be described in greater detail subsequently.

The housing 11 defines a cylindrical bore 19, a portion of which defines a set of internal threads for threaded engagement with the orifice member 17. Pressurized fluid is communicated from the discharge port of the pumping element into the bore 19 by means of a passage 21, and excess fluid may be communicated from the bore 19 back to the inlet port of the pumping element by means of a passage 23.

Slidably disposed within the bore 19 is a bypass valve piston 25, which is biased to the right in FIG. 2 by a compression spring 27, and biased to the left by the pressure of fluid being discharged into the bore 19 through passage 21. The orifice member 17 communicates the pressurized discharge fluid from the passage 21, through a metering orifice 29 to a threaded discharge port 31 to which is connected the upstream end of the conduit C1 (from FIG. 1).

The orifice member 17 defines a radial passage 33 which communicates a pressure signal from the metering orifice 29, through a series of drilled signal passages 35, 37, and 39 to a signal chamber 40, adjacent the left end of the piston 25. As is well known in the art of power steering pumps, the bypass flow control arrangement described above is commonly used and provides an output flow from the discharge port 31 which is directly proportional to engine speed, and pump input speed, up to a predetermined flow rate, at which point the flow rate from the discharge port 31 levels off and remains constant as engine speed continues to rise.

Figure 3:
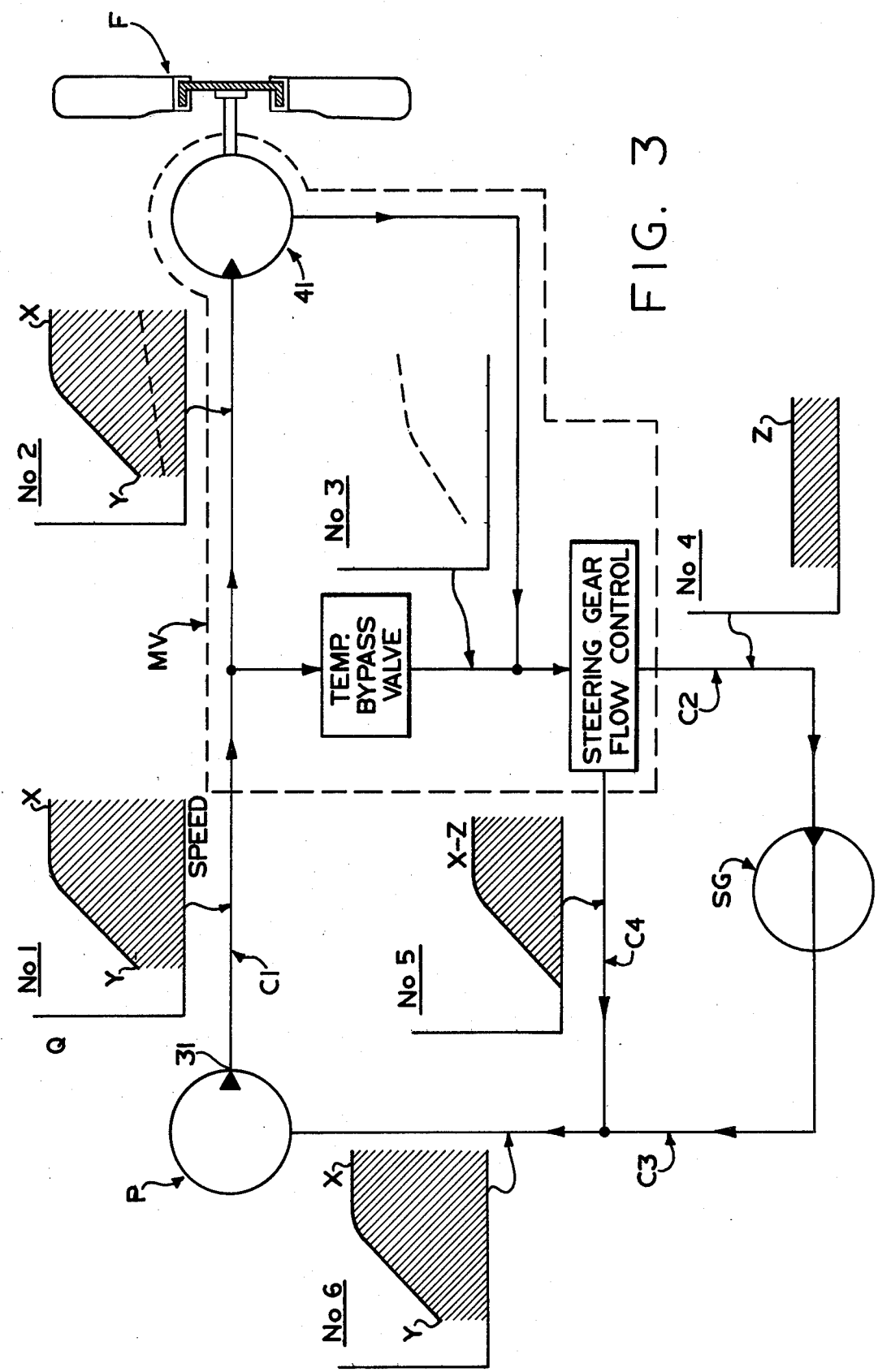
FIG. 3 is a hydraulic schematic of a fan drive system in accordance with the present invention.

The above-described flow control feature is illustrated graphically in FIG. 3, which is a hydraulic schematic of the fan drive system of the present invention. In order to provide a better understanding of the invention, various portions of the schematic of FIG. 3 have associated therewith a graph of flow versus speed (either engine or pump input). It should be noted that the graphs do not include numbers, indicating specific flow quantities or specific speeds, but are intended merely to indicate relative flow quantities for purposes of describing the invention schematically and conceptually. However, it should also be noted that the graphs cover what will be referred to hereinafter as the "range of operation engine speeds", i.e., speeds ranging from approximately engine idle up to an engine speed corresponding to a typical vehicle cruising speed, such as 55 mph.

Referring still to FIG. 3, it may be seen in graph No. 1 that the power steering pump P, which is the sole source of pressurized fluid for the system, delivers fluid through the conduit C1 to the motor-valve apparatus MV at a rate of Y at engine idle. The flow rate through the conduit C1 increases generally proportional to input speed until a flow rate of X occurs, and as engine speed increases further, all fluid in excess of X is recirculated internally within the pump P as was described previously. As may be seen in graph No. 1, the flow rate X is substantially greater than the flow rate Y.

Pressurized fluid entering the motor-valve apparatus MV flows through one of two alternative flow paths. When operation of the radiator cooling fan F is required, substantially all of the fluid entering the motor-valve apparatus MV flows through the fan motor, generally designated 41, as is illustrated by the solid line in graph No. 2. In this condition, the fan motor 41 is referred to as being "engaged", and practically no fluid passes through the temperature bypass valve, as is illustrated by the lack of a solid line in graph No. 3.

Although the flow into the fan motor 41, in the engaged condition, is shown in graph No. 2 as substantially identical to the pump output shown in graph No. 1, it should be understood that such a relationship is not an essential feature of the present invention. Thus, the flow through the motor 41 could be somewhat less than the flow rate of X, although normally it would be desirable to utilize the full pump output to drive the motor 41, thereby minimizing the pressure drop needed to achieve a desired fan drive horsepower, as will be explained in greater detail subsequently.

When very little cooling is required, and it is sufficient for the fan motor 41 to turn the fan F at a relatively low speed, the fan motor 41 is referred to as being "disengaged", as is illustrated by the dashed flow curves in graphs No. 2 and No. 3. From graph No. 2 it may be seen that a certain quantity of fluid will be permitted to drive the fan motor 41, while the remainder of the fluid flows through the temperature bypass valve, bypassing the motor 41. It should be understood that the relationship of flow through the motor 41 (in the disengaged condition) and the input speed is not limited to that shown in graph No. 2, which is by way of example only, but may vary somewhat depending upon the set points of the system.

The temperature bypass valve, which will be described in greater detail subsequently, may be of the type generally well known in the art, responsive to ambient air temperature within the engine compartment or to water temperature within the radiator or engine block. However, it should be understood that the present invention is not limited to any particular arrangement for making the bypass valve temperature responsive, and it is within the scope of the present invention for the bypass valve to be actuated mechanically, electrically, or in any other manner, in response to air temperature, water temperature, or any other similar indication of the need for cooling of the radiator or operation of the cooling fan F. Merely by way of example, the bypass valve could be operated by a head pressure switch in response to variations in head pressure within the air conditioning compressor.

The outlet flow from the fan motor 41 and the bypass flow, if any, recombine within the motor-valve apparatus MV and flow into a steering gear flow control, such that regardless of the need for cooling, the input to the steering gear flow control may be represented by a flow curve substantially as in graph No. 1.

The purpose of the steering gear flow control is to provide to the steering gear mechanism SG the required quantity of fluid. As is well known to those skilled in the art, the conventional automotive steering gear mechanism is of the open-center type such that the steering gear is designed to have a generally constant flow rate therethrough, with the fluid pressure being dependent upon the steering load. One of the reasons for the conventional steering gears being open-center is the desire to use a fixed displacement power steering pump, the least expensive type of pump. However, as will be understood by those skilled in the hydraulics art, the inclusion of the steering gear flow control in the present invention effectively makes the overall system open-center, even if a closed-center steering gear were substituted for the conventional open-center steering gear. Therefore, it is within the scope of the present invention to use a steering gear mechanism SG which is not open-center, in which case, the steering gear flow control directs fluid to the steering gear SG only in response to a "demand" for fluid. Accordingly, the system includes a steering gear flow control capable of communicating a fluid flow rate of approximately Z (graph No. 4) to the steering gear mechanism SG over the entire range of operating engine speeds, the flow rate Z being substantially less than the flow rate X.

Although graph No. 4 illustrates the flow rate Z as constant, it should be appreciated that the flow rate through the steering gear SG is an inherent feature of the steering gear, and therefore, the curve of flow rate Z in graph No. 4 could vary from that shown. For example, the line could slope somewhat in either direction and/or could include a slight rise or drop at one end or the other. Furthermore, in the subject embodiment, the system components are sized such that the flow rate Y from the pump P at engine idle is substantially identical to the flow rate Z through the steering gear SG, although, within the scope of the present invention, the flow rate Y may be greater than the flow rate Z, or less than the flow rate Z which occurs at higher engine speeds if Z is not perfectly constant.

At the same time, the steering gear flow control is operable to communicate substantially all of the inlet fluid flow in excess of Z (graph No. 5) through the conduit C4 to bypass the steering gear and recombine with the fluid leaving the steering gear by means of the conduit C3. Downstream of the junction of the conduits C3 and C4, it may be seen (graph No. 6), that the flow returning to the inlet of the power steering pump P is substantially identical to the flow being discharged from the pump P. It may also be seen that the present invention makes it possible to drive a hydraulic fan motor and operate a hydraulic steering gear mechanism in series, using a conventional power steering pump (with a modified flow control setting), with each of the fan motor and the steering gear receiving the quantity of fluid appropriate for its operation, independent of the other. This aspect of the invention will be described in greater detail subsequently.

Figure 4:
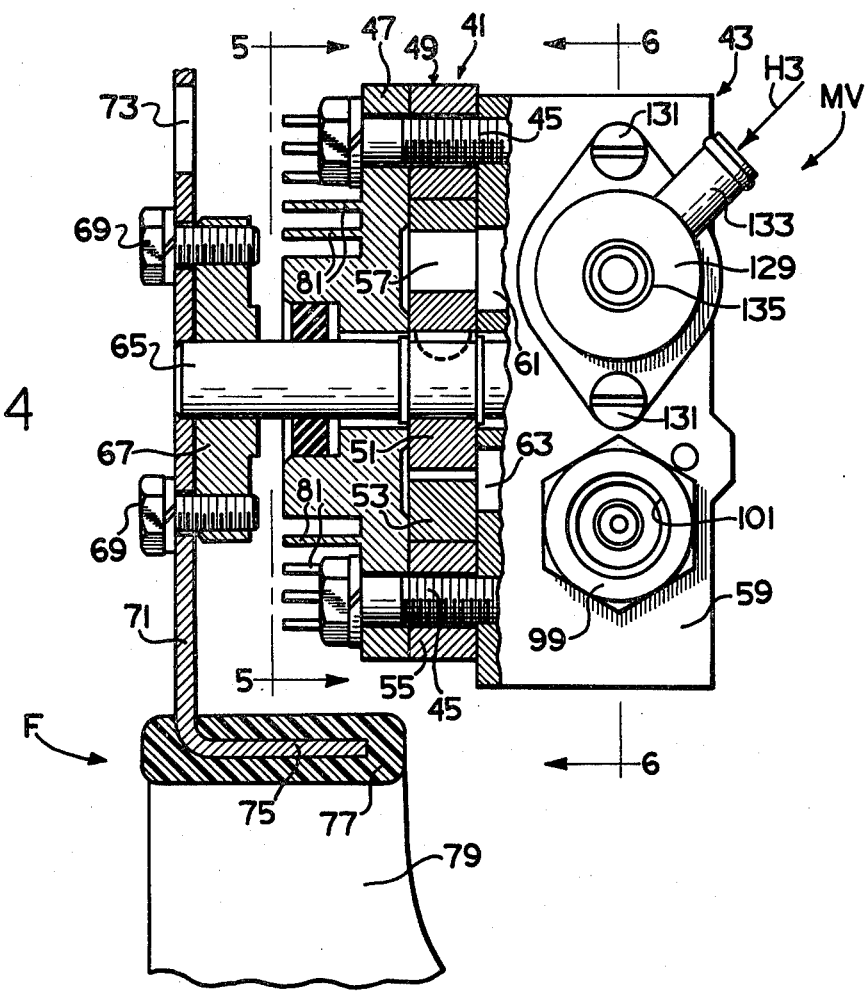
FIG. 4 is a view, partly in elevation, and partly in cross section, of a motor-valve apparatus for use in the system of the present invention.
Figure 5:
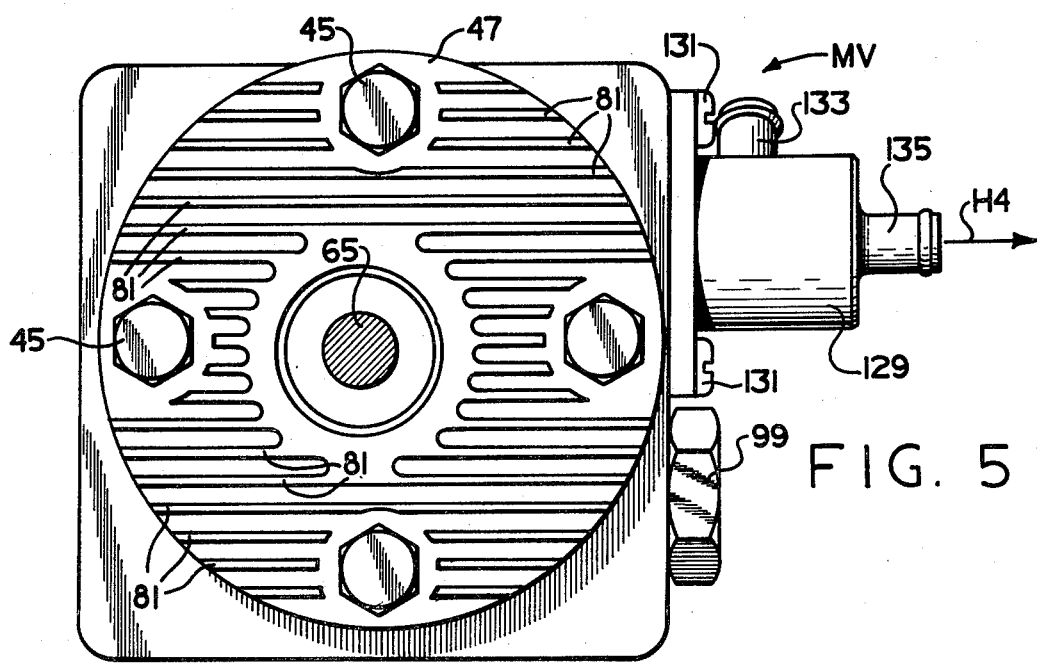
FIG. 5 is a view taken on line 5—5 of FIG. 4, and on the same scale.
Figure 6:
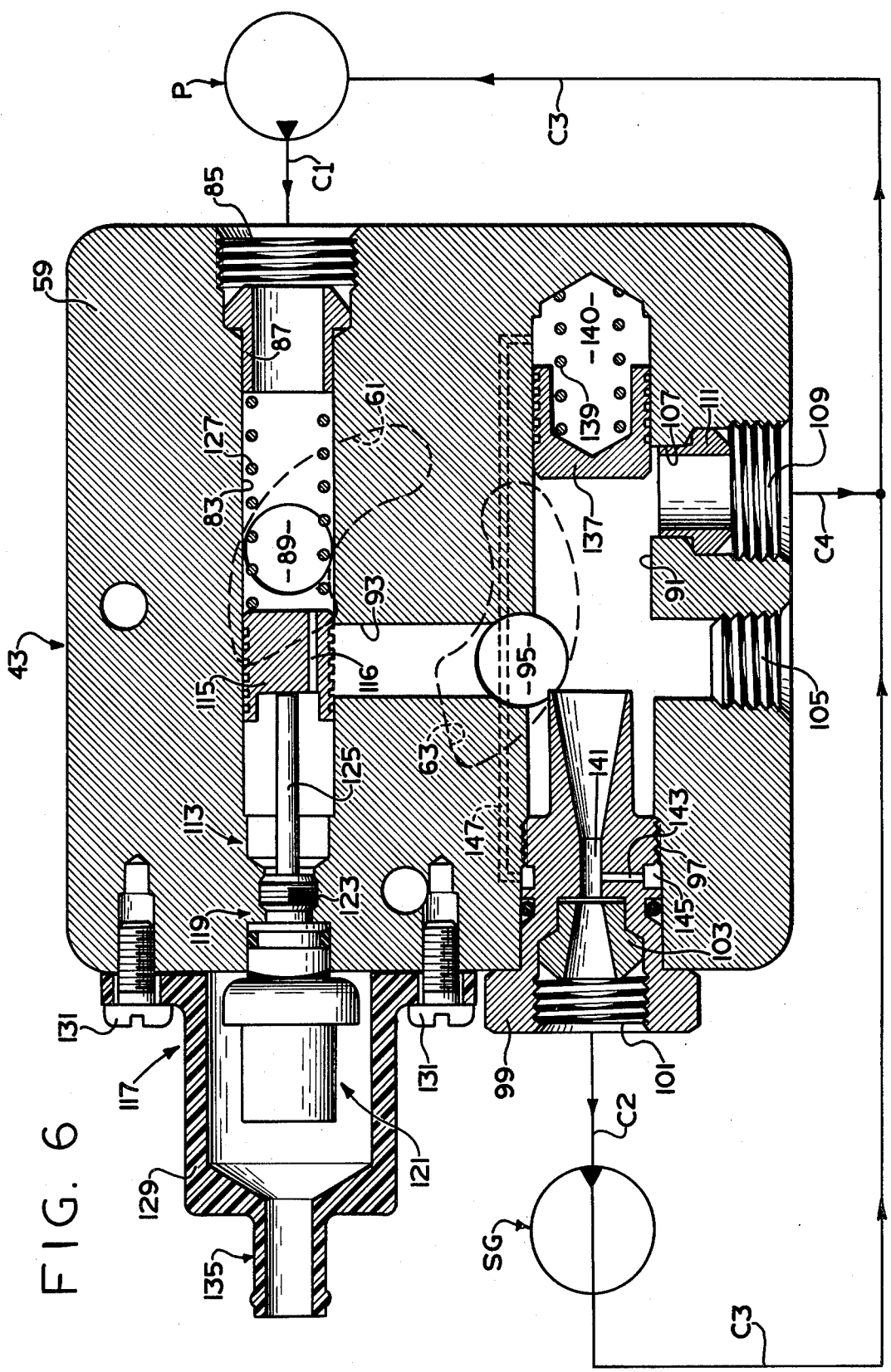
FIG. 6 is a transverse cross section taken on line 6—6 of FIG. 4, and on a larger scale.

Referring now to FIGS. 4 through 6, a preferred embodiment of the motor-valve apparatus MV will be described in detail. As may best be seen in FIG. 4, the motor-valve apparatus MV includes the fan motor 41 and a valve portion 43, held together by a plurality of bolts 45. Although, in the subject embodiment, the fan motor 41 and valve portion 43 are illustrated as an assembly, it will be apparent to those skilled in the art that the motor 41 and valve portion 43 could be separate from each other, and could be combined with various other system components. For example, the valve portion 43 could be combined with the power steering pump P or the steering gear mechanism SG. However, in the subject embodiment, the motor 41 and valve portion 43 have been combined for reasons which will become apparent.

The fan motor 41 comprises a front cover member 47 and, disposed between the cover member 47 and the valve portion 43, a gerotor gear set 49. The gerotor gear set 49 includes an externally toothed inner rotor 51, eccentrically disposed within an internally toothed outer rotor 53, the outer rotor 53 being rotatably disposed within a spacer ring 55. As is well known in the art of gerotor gear sets, the inner rotor 51 has one less tooth than the outer rotor 53, such that the toothed engagement of the rotors 51 and 53 defines a plurality of fluid volume chambers 57. It should be understood that the use of a gerotor gear set in the motor 41 is not an essential feature of the present invention. However, it is preferred that the motor comprise a positive displacement device, operable to translate a flow of pressurized fluid into a rotary output and that the device define expanding and contracting fluid volume chambers. Examples of other types of devices which may be used herein are internal and external gear, sliding vane, radial piston or ball, and axial piston or ball.

The valve portion 43 includes a housing 59 defining an inlet kidney port 61 and an outlet kidney port 63 (see also FIG. 6). As will be further described subsequently, pressurized fluid from the inlet kidney port 61 is communicated to the volume chambers which are expanding, thereby turning the inner rotor 51, while fluid in the volume chambers which are contracting is discharged into the outlet kidney port 63. The inner rotor 51 is keyed to an output shaft 65 which drivingly engages a backup plate 67.

The radiator cooling fan F, the specific design of which forms no part of the present invention, is shown herein as a combination plastic and metal fan assembly. Attached to the backup plate 67 by a plurality of bolts 69 is a metal spider 71, including a plurality of openings 73 through which incoming air is permitted to flow. The metal spider includes an annular outer portion 75 embedded within, and surrounded by a hub portion 77 of a plastic fan, the plastic fan including a plurality of fan blades 79 extending radially from the hub 77.

Referring now to FIG. 5, in conjunction with FIG. 4, it may be seen that the front cover member 47 includes a plurality of cooling fins 81, the purpose of which is to achieve cooling of the hydraulic fluid as it flows through the gerotor gear set 49. This cooling of the fluid is aided by the movement of air axially through the openings 73 in the metal spider 71 and into the fins 81. The fins 81, which are not an essential feature of the invention, could take various other forms and orientations. For example, the fins 81 could be arranged to extend radially.

Referring now to FIG. 6, which is a transverse cross section through the valve portion 43, but on a larger scale than FIG. 4, the construction and operation of a preferred embodiment of the valve portion 43 will be described in detail. The housing 59 defines an inlet passage 83 having, at its right end in FIG. 6, a threaded inlet port 85. Disposed within the inlet passage 83 is a deformable fitting member 87 which sealingly engages a fitting (not shown) at the end of the conduit C1 when the fitting is threaded into the inlet port 85. The inlet passage 83 communicates with a fluid pressure port 89, which opens into the inlet kidney port 61 to communicate pressurized inlet fluid from the pump P to the expanding volume chambers as described previously.

The housing 59 also defines an outlet passage 91, and a bypass passage 93 providing fluid communication between the inlet passage 83 and the outlet passage 91. The bypass passage 93, adjacent its intersection with the outlet passage 91, communicates with a fluid return port 95, which receives from the outlet kidney port 63 the fluid being exhausted from the contracting volume chambers as was described previously.

The outlet passage 91 defines a set of internal threads 97 which receive the mating external threads of an orifice member 99. The orifice member 99 defines a primary outlet port 101 and includes a deformable fitting 103 which sealingly engages a fitting (not shown) attached to the upstream end of the conduit C2 when the fitting is threaded into the primary outlet port 101.

In the subject embodiment, the bypass passage 93 intersects the outlet passage 91 and defines a set of internal threads which receive a threaded sealing plug 105. Disposed to the right of the plug 105 in FIG. 6 is a secondary passage 107 which communicates with the outlet passage 91 and defines a secondary outlet port 109. Disposed within the passage 107 is a deformable fitting 111 which sealingly engages a fitting (not shown) attached to the upstream end of the conduit C4, when the fitting is threaded into the secondary outlet port 109.

Disposed at the left end of the inlet passage 83 is a temperature responsive bypass valve assembly, generally designated 113. The valve assembly 113 includes a bypass piston 115, slidably disposed within the inlet passage 83 between first and second positions. In the first position (as shown in FIG. 6) the piston 115 substantially prevents fluid communication from the inlet passage 83 to the bypass passage 93. The bypass piston 115, in the second position, is disposed to the left of the position shown in FIG. 6, and fluid flow is permitted from the inlet passage 83 to the bypass passage 93 at a flow rate which is at least a major portion of the flow rate X, as described previously in connection with graph No. 3 in FIG. 3.

The position of the bypass piston 115 and thus, the speed of operation of the fan motor 41, is determined by a temperature sensing and positioning assembly 117, which includes a power element, generally designated 119. The power element 119 includes a container 121 which is in threaded engagement with the housing 59 at threads 123. Projecting from the power element 119 is a pushrod 125 engaging the left end of the bypass piston 115, which is biased into engagement with the pushrod 125 by a biasing spring 127, seated against the fitting 87. The bypass piston 115 defines a pilot passage 116 communicating pressure from the front side (right side in FIG. 6) of the piston 115 to the back side thereof to balance the fluid pressures acting on the piston. Thus, the net axial load on the pushrod 125 of the power element 119 is merely the compression force of the spring 127.

The container 121 is filled with a wax material having a high coefficient of expansion at its liquid-solid phase change temperature, as is well known in the fan drive art. When the temperature of the power element 119 reaches a predetermined level, the wax in the container 121 liquifies and expands substantially, moving the pushrod 125 to the right (in FIG. 6), thereby moving the bypass piston 115 toward the position shown in FIG. 6 in which substantially all of the fluid entering the inlet port 85 flows through the pressure port 89 to operate the fan motor 41.

In the subject embodiment, the particular temperature condition to which the temperature sensing and positioning assembly 117 responds is the temperature of the water flowing from the engine block to the top tank of radiator R, frequently referred to as "top-tank". Therefore, the bypass piston 115 is in its first position, preventing bypass flow, at a relatively higher temperature, and is in its second position, permitting bypass flow, at a relatively lower temperature. By way of example only, and in reference to top-tank temperature, a "relatively higher temperature" would be about 240 degrees F. (115 degrees C.) and a "relatively lower temperature" would be about 220 degrees F. (104 degrees C.).

Referring to FIG. 1, it may be seen that a small hose H3 branches off of the main water hose H1 adjacent the engine E and communicates a certain volume of hot water to the motor-valve apparatus MV to accomplish the necessary temperature sensing. Another hose H4 communicates this same hot water to the radiator where the water recombines with the rest of the hot water communicated by the hose H1 from the engine to the radiator. Referring again to FIG. 6, in conjunction with FIGS. 4 and 5, it may be seen that the wax filled container 121 is surrounded by a molded plastic enclosure 129 which is attached to the housing 59 by a pair of machine screws 131. The enclosure 129 includes an inlet portion 133 (FIGS. 4 and 5), adapted to have the hose H3 clamped thereabout, permitting the hot temperature-sensing water to fill the enclosure 129 and control the power element 119 as described previously. Hot water is permitted to flow out of the enclosure 129 through an outlet portion 135, adapted to have the hose H4 clamped thereabout.

Referring again primarily to FIG. 6, in conjunction with FIG. 3, it may be seen that substantially all of the fluid entering the inlet port 85, whether it flows through fan motor 41 or through the bypass passage 93, enters the outlet passage 91. Disposed within the outlet passage 91 is the steering gear flow control (shown schematically in FIG. 3), which includes the orifice member 99 and a second bypass piston 137. The bypass piston 137 is slidably disposed within the outlet passage 91, is biased to the right in FIG. 6 by the pressure of fluid entering the outlet passage 91, and to the left by the combined force of a biasing spring 139 and the fluid pressure within a pressure chamber 140.

As was explained in connection with the schematic of FIG. 3, it is the function of the steering gear flow control to communicate to the steering gear SG the desired quantity of fluid, regardless of engine speed or fluid pressure within the system, and to bypass all fluid in excess of the desired quantity. To accomplish this flow control function, the orifice member 99 defines a metering orifice 141 which communicates with a radial passage 143 and an annular groove 145. The passage 143 and groove 145 communicate a pressure signal from the metering orifice 141 to the pressure chamber 140 through a passage 147 defined by the housing 59. It is believed that the principle of operation of a flow control arrangement of the type disclosed herein is sufficiently well known to those skilled in the art that only a brief explanation is required. When the quantity of fluid entering the outlet passage 91 is approximately that required for operation of the steering gear, the pressure signals acting on the bypass piston 137 will be such that the piston 137 will move to the left from the position shown in FIG. 6 to substantially prevent communication from the outlet passage 91 to the secondary outlet port 109.

As the quantity of fluid entering the outlet passage 91 increases beyond that required to operate the steering gear, the pressure drop across the metering orifice 141 begins to increase, biasing the bypass piston 137 toward the right in FIG. 6, beginning to permit fluid communication from the outlet passage 91 to the secondary outlet port 109. As the pump speed continues to increase, and the flow into the outlet passage 91 reaches the flow rate X, the bypass piston 137 moves to approximately the position shown in FIG. 6, such that a major portion of the fluid entering the outlet passage 91 flows to the secondary outlet port 109, bypassing the steering gear (flow rate X-Z in graph No. 5).

Figure 7A:
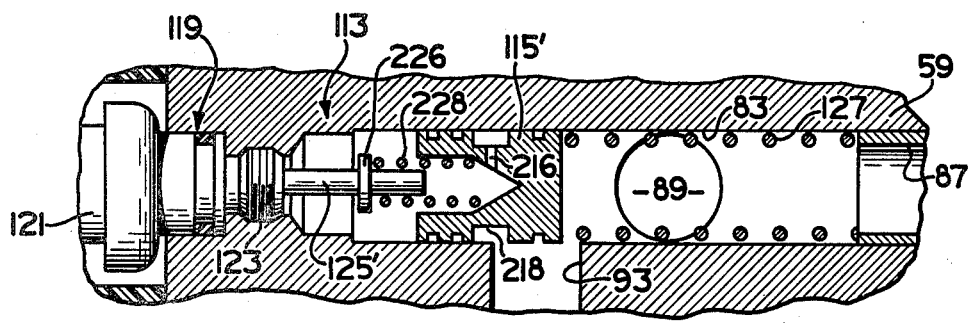
FIGS. 7A and 7B are fragmentary cross sections similar to FIG. 6, illustrating alternative embodiments of one aspect of the present invention.
Figure 7B:
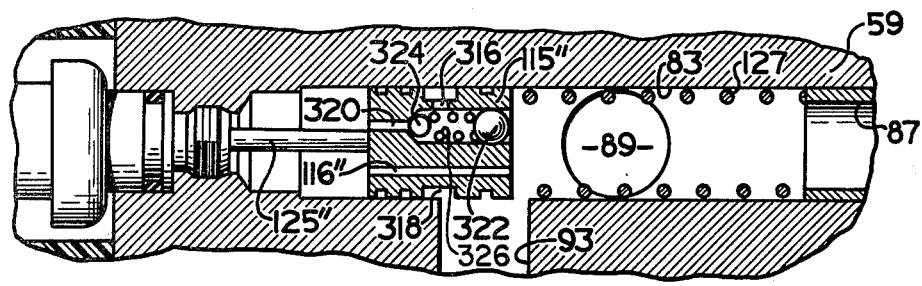
Figure 8:
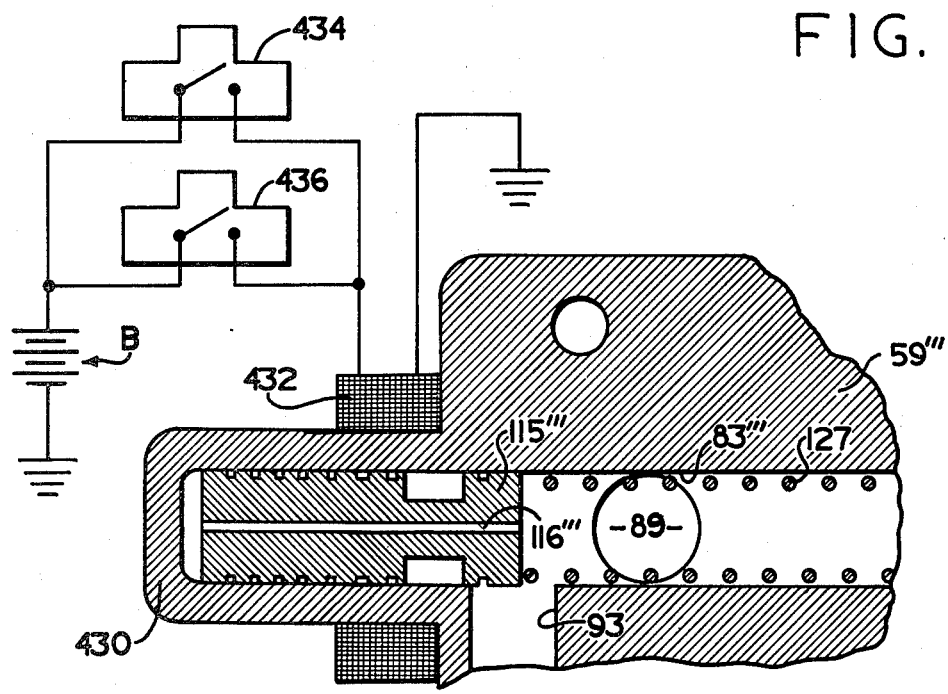
FIG. 8 is a fragmentary cross section, similar to FIG. 6, illustrating another alternative embodiment of one aspect of the present invention.

Referring now to FIGS. 7A, 7B, and 8, there are illustrated three alternative embodiments of the present invention, with like elements bearing the same numerals, modified elements bearing primed numerals, and new elements bearing numerals above 200, 300, and 400 respectively.

In FIG. 7A, the bypass valve assembly 113 includes a bypass piston 115' which is biased to the left by the spring 127, and biased to the right by a spring 228, seated against flange 226 formed on the pushrod 125'. The spring 228 is received within a central open portion defined by the bypass piston 115', the open portion being in fluid communication with the bypass passage 93 by means of a radial passage 216 and an annular channel 218. Thus, the bypass piston 115' is not subjected to balanced fluid pressures as in the embodiment of FIG. 6, but instead, is subjected to the pressure drop across the fan motor 41 (i.e., the pressure drop from the pressure port 89 to the return port 95).

In FIG. 7B there is shown an arrangement in which the bypass piston 115" is biased to the left, into engagement with the pushrod 125" by a spring 127. The bypass piston 115" defines a pilot passage 116" such that, under normal operating conditions, the piston 115" is subjected to balanced fluid pressures. The piston 115" also defines a second pilot passage 320 which opens into an enlarged bore having its right end sealed by a ball 322 pressed into the bore. Seated against the right end of the pilot passage 320 is a ball valve 324, biased to the closed position by a spring 326, seated against the ball 322. In the event that the fluid pressure within the inlet passage 83 rises to an undesirably high level (for example, if the fan motor 41 seizes up), the excessive pressure is communicated through the pilot passage 116" and through the pilot passage 320 to unseat the ball valve 324. The relieved fluid then flows out through the radial passage 316, through the annular bore 318 into the bypass passage 93, thus relieving the pressure acting on the left face of the bypass piston 115", permitting it to move to approximately the position shown in FIG. 7B. Therefore, sufficient inlet fluid will bypass the fan motor 41 and be available downstream to operate the power steering gear SG.

In FIG. 8 there is shown an alternative embodiment of not only the bypass piston, but also of the manner of controlling the position of the bypass piston. The housing 59''' includes a generally cylindrical portion 430, and defines the inlet passage 83'''. The bypass piston 115''' may have any of the several configurations described previously, but is illustrated in FIG. 8 as including only a pilot passage 116''', such that the fluid pressures acting on the bypass piston 115''' are balanced. Surrounding the housing portion 430 is an electromagnetic coil 432 which is operable, when energized, to exert a biasing force on the bypass piston 115''' to move it from the position shown in FIG. 8 toward the right (i.e., to block bypass flow), in opposition to the force of the spring 127. Energization of the electro-magnetic coil 432 may typically be accomplished from a power source such as the vehicle battery B and, in FIG. 8, is illustrated as being controlled by a parallel combination of switches. The switch arrangement includes a radiator temperature switch 434 and a compressor head pressure switch 436. If either of the switches 434 or 436 is subjected to a condition indicative of the need for operation of the fan F, the particular switch closes, permitting the coil 432 to be energized, and causing substantially all fluid entering the inlet passage 83''' to flow through the fan motor 41. In general, although the switch arrangement shown in FIG. 8 results in "on-off" operation of the coil 432, it would be obvious to modify the switch arrangement to provide some sort of proportional control of the coil 432, i.e., partial energization proportional to the need for fan operation.

In the background portion of the present specification there was a brief discussion of the hydraulic fan drive system illustrated in U.S. Pat. No. 3,659,567, which will be referred to hereinafter as the "prior art" hydraulic fan drive system. In the prior art system, the hydraulic fan motor and the power steering mechanism are in a series circuit, supplied with pressurized fluid by a "constant flow" pump, i.e., a power steering pump which reaches its maximum output flow rate at about engine idle, such that the output flow rate of the pump is substantially constant over the range of engine operating speeds. The prior art system further includes a temperature responsive bypass valve, operable to bypass the fan motor when operation of the fan in unnecessary. Therefore, when the prior art system is in the "engaged" condition, the flow through the fan motor is substantially constant over the range of operating engine speeds, and is substantially the same as the flow rate through the steering gear.

Figure 9:
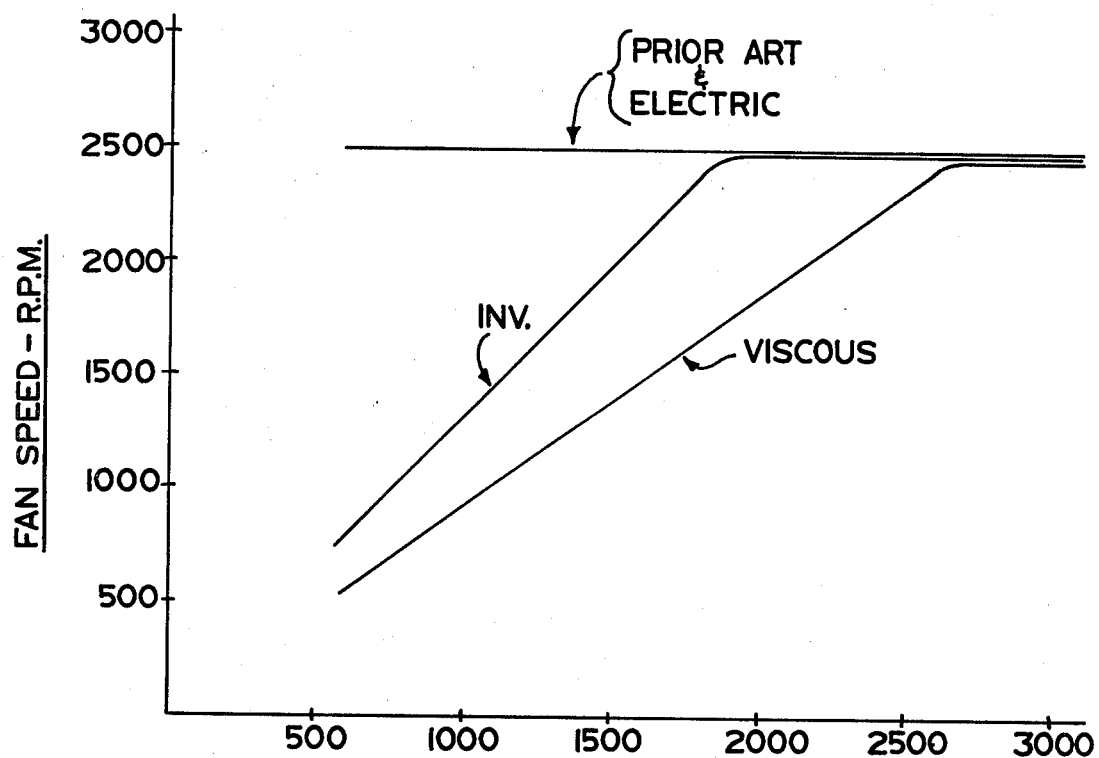
FIG. 9 is a graph of fan speed versus engine speed, comparing the present invention to the preferred viscous curve and to various prior art systems.

The above-described relationship is illustrated in FIG. 9, which is a graph of fan speed (rpm) versus engine speed (rpm). It may be seen that both the prior art system and a typical electric fan drive provide a substantially constant fan speed over the range of operating engine speeds, whereas the curve representing the fan drive system of the present invention conforms generally to the typical viscous curve, as is normally required by U.S. vehicle manufacturers. It should also be understood that the system of the present invention can be modified to provide practically any desired curve of fan speed versus engine speed. For example, the sloped portion of the curve may be shifted to the right by decreasing the displacement of the fan motor 41, or shifted to the left by increasing the displacement of the fan motor. The slope or angle of the slope portion can be reduced (made flatter) by reducing the displacement of the power steering pump P, or made steeper by increasing the displacement of the pump. Finally, the level portion of the curve can be shifted upward by increasing the maximum flow rate permitted by the bypass flow control valve in the power steering pump P, or can be shifted downward by reducing the maximum flow rate permitted.

In order to further illustrate the improved performance of the present invention over the prior art system, an example will be presented. The example will make reference to FIG. 10, which is a graph of Incremental Horsepower versus Engine Speed, and for each of the three alternative systems, provides a comparison of fan horsepower and input horsepower. As used herein, the term "incremental horsepower" means, in reference to fan horsepower, the amount of horsepower actually consumed by the fan motor, and in reference to the input horsepower, the amount of horsepower required by the pump over and above that required to drive the steering gear.

Figure 10:
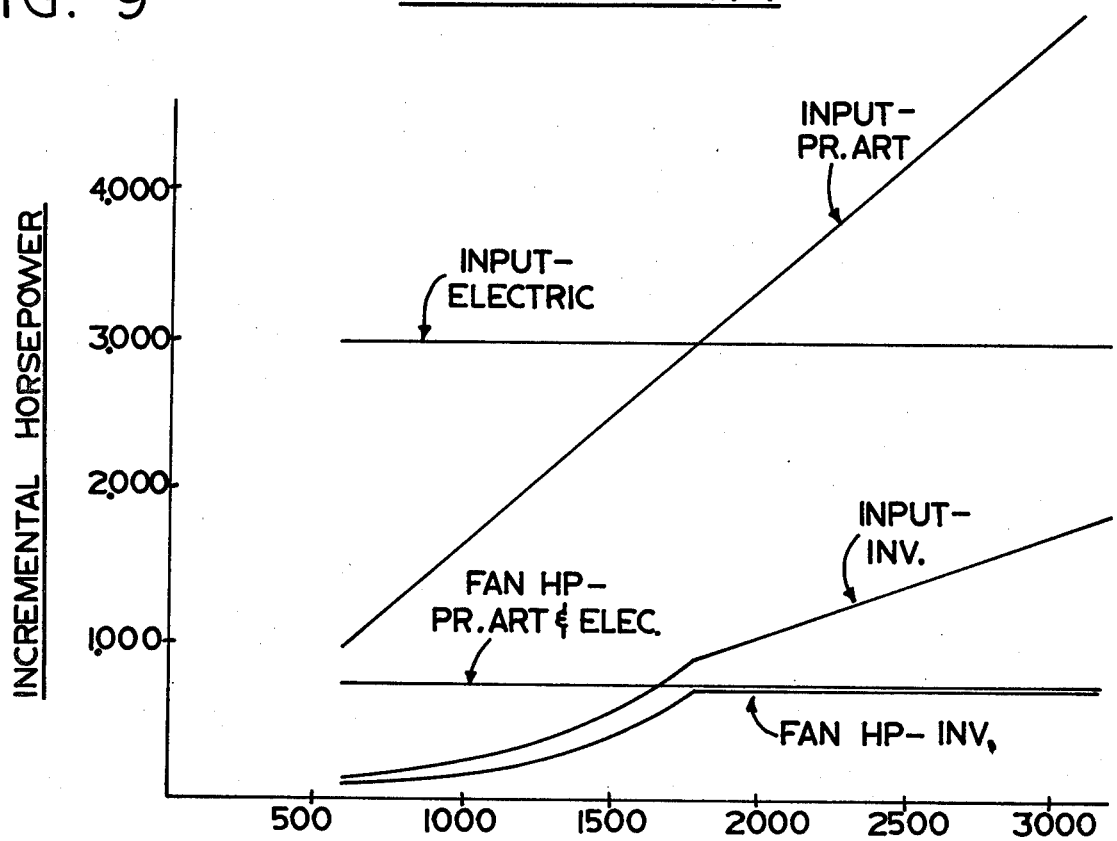
FIG. 10 is a graph of incremental horsepower versus engine speed, comparing the invention to the prior art fan drive systems.

In order to provide a meaningful comparison of the prior art system and the present invention, it is necessary to have the same steering gear mechanism in each of the hydraulic systems, and for purposes of FIG. 10 and the example, it has been assumed that the open-center steering gear mechanism receives a substantially constant flow of 2.0 gpm. A related assumption is that in both of the hydraulic systems, the power steering pumps are the same internally, i.e., they have the same pumping element and displacement. This assumption follows logically if both power steering gears are to receive 2.0 gpm at engine idle. The comparison is also based upon the assumption that, at peak fan speeds, each of the three fan motors consumes about 0.75 hp, as is shown in FIG. 10. As is well known to those skilled in the art, the horsepower consumed by the fan motor is determined by the torque required to turn the fan at the given speed, and in turn, the fan torque is related to such factors as the size and design of the fan.

As was stated in the background of the present specification, the size and cost of an electric motor capable of providing the necessary fan horsepower is probably prohibitive. However, for purposes of a complete comparison, FIG. 10 includes a graph of the approximate input horsepower required for an electric fan motor to provide 0.75 hp to drive the fan. Based upon typical efficiency values of fifty percent for both the electric motor and the vehicle alternator, it is seen in FIG. 10 that about 3.0 hp is required as the input to the alternator, thus making the electric fan system about twenty-five percent efficient.

In comparing the performance and efficiency of the prior art hydraulic system and the invention, two operating conditions will be considered separately: operation at a selected design point such as three times fan idle, and operation at engine idle. Also, it will be necessary to relate various system characteristics such as the following:

eff.—overall fan motor efficiency;
HP—incremental horsepower consumed by the pump;
fhp—horsepower required to drive fan;
hp—input horsepower to fan motor;
Q—flow rate (gpm) discharged by pumping element;
q—flow rate (gpm) through fan motor;
dP—pressure drop (psi) across fan motor.

The primary relationship which will be used in this example is the following:

$$\text{horsepower} = \frac{\text{flow} \times \text{pressure drop}}{1714}$$

As was indicated in the graphs of FIG. 3, the flow rate X is substantially greater than the flow rate Y, and in the subject embodiment, with the flow rate Y being 2.0 gpm, the flow rate X is taken to be 6.0 gpm. Below is a table comparing the prior art system and the present invention, at an engine speed of about 1800 rpm with the first column indicating the system characteristic ("Quantity"), and the second column indicating its "Source", either than the Quantity was assumed ("given") or that it was calculated.

| Quantity | Source | Prior Art | Invention |
|---|---|---|---|
| fhp | given | .75 | .75 |
| eff. | given | 75% | 75% |
| hp | given | 1.00 | 1.00 |
| q | given | 2.0 | 6.0 |
| dP | $\frac{hp \times 1714}{q}$ | 857 | 285 |
| Q | given | 6.0 | 6.0 |
| HP | $\frac{Q \times dP}{1714}$ | 3.0 | 1.0 |

The example illustrates that the fan drive system of the present invention requires only one-third as much additional pump horsepower as does the prior art system.

Turning now to the condition at engine idle, it should be remembered that the prior art system still operates at the same fan speed, but with pump input speed reduced to about one third of that in the previous table. However, because of the "viscous" characteristics of the invention, fan speed drops to about one-third of that previously considered. As is well known in the art, fan torque varies as the square of the fan speed, and pressure drop across the fan motor is proportional to fan torque. Therefore, as fan speed drops to one-third pressure drop across the fan motor drops to one-ninth (of 285 psi) or 32 psi.

Comparing the incremental pump horsepowers considered by the two systems at engine idle leads to the following:

| Quantity | Prior Art | Invention |
|---|---|---|
| dP | 857 | 32 |
| Q | 2.0 | 2.0 |
| HP = $\frac{(Q \times dp)}{(1714)}$ | 1.0 | .037 |

Therefore, while the prior art system consumes three times as much horsepower as the invention during normal operation, it consumes twenty-seven times as much horsepower at engine idle, while operating. It should be understood that because the prior art system provides a greater amount of horsepower to the fan at idle (FIG. 10), the prior art system is engaged a smaller percent of the time than the system of the invention. As a result, total horsepower consumed by the prior art fan motor over a period of time at idle is substantially greater than the invention, but not by a factor of 27. It should also be noted from FIG. 10 that for each of the systems (prior art and invention), the difference between input hp and fan hp represents heat which must be dissipated from the system. For example, at an engine speed of 3,000 rpm, the prior art system must dissipate over 4 hp, while the invention must dissipate only about 1 hp.

Moreover, as is well known in the art, the steering load (i.e., pressure drop across the power steering gear) is greatest at engine idle and decreases rapidly as vehicle speed increases. Because the fan motor and the steering gear are in hydraulic series, the pump must be able to supply a pressure which is the sum of the pressure drops across the fan motor and steering gear. Assuming a steering load of about 1000 psi at engine idle (or low speed, such as during parking), the system of the present invention would require a pump output pressure of about 1032 psi (1000+32), whereas the prior art system would require about 1857 psi (1000+857), well above a typical power steering pump relief setting of about 1200 psi. In the system provided by the invention, the pressure requirements are complementary, i.e., fan motor pressure is lowest when steering pressure is highest (engine idle), and steering pressure is lowest when fan motor pressure is highest (cruising speed).

Figure 11:
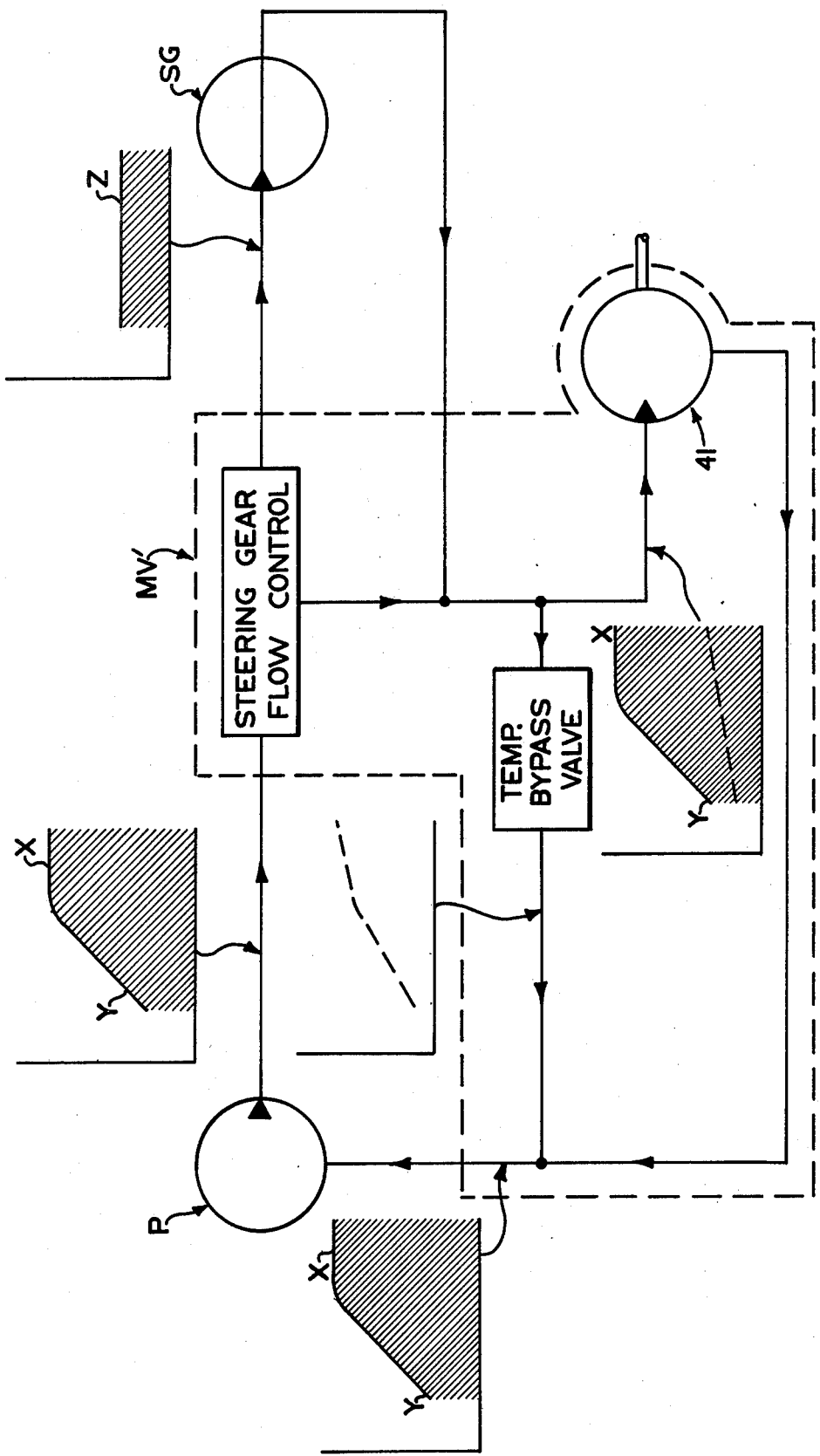
FIG. 11 is a hydraulic schematic, similar to FIG. 3, illustrating an alternative embodiment of the system of FIG. 3.

Referring now to FIG. 11, there is illustrated an alternative embodiment of the system of FIG. 3, with like elements bearing like references. The primary difference between the FIG. 11 embodiment and that of FIG. 3 is the flow sequence, i.e., in FIG. 3, the output from the power steering pump P flows through the fan motor 41, then through the steering gear SG. In FIG. 11, the output flow from the power steering pump P enters the motor-valve apparatus MV' and flows to the steering gear flow control, which permits fluid to flow through the steering gear SG at a flow rate of Z. All fluid in excess of the flow rate Z is directed downstream by the steering gear flow control in the same manner as indicated by graph No. 5 in FIG. 3.

The excess fluid from the steering gear flow control and the flow through the steering gear SG recombine, then flow either through the fan motor 41 or through the temperature bypass valve in the same manner as indicated by graphs No. 2 and No. 3, respectively, in FIG. 3. The flows through the fan motor 41 and the temperature bypass valve recombine and return to the pump P.

Accordingly, it may be seen that in the alternative embodiment of FIG. 11, each of the individual components operates in substantially the same manner as in the preferred embodiment, and in certain circumstances, the embodiment of FIG. 11 may be preferred. However, the FIG. 3 embodiment is normally preferred because the commercially available power steering gear mechanisms may not be able to withstand the higher fluid pressure to which it would be subjected if it were the upstream component as in FIG. 11. It should be apparent that the physical arrangement of the motor-valve apparatus MV', for use in the FIG. 11 system, would be different than the apparatus MV for use in the FIG. 3 system. However, it would be obvious to one skilled in the art, based upon FIGS. 4, 5, and 6 and the associated specification, how to construct the apparatus MV' to make the FIG. 11 system operate satisfactorily.

What is claimed is:

1. A vehicle engine accessory drive system comprising:

(a) an engine driven pump including a pumping element operable to deliver fluid at a rate generally proportional to engine speed, and fluid inlet and outlet ports, said pump having a fluid delivery rate of Y at engine idle, said pump comprising the sole source of pressurized fluid for said system and including first flow control valve means operable to limit the fluid delivery rate of said pump to X at higher engine speeds, X being substantially greater than Y;

(b) a hydraulic fan motor having fluid inlet and outlet ports, said fluid inlet port being connected to said pump outlet port, said fan motor having a fan speed at engine idle corresponding to a fluid flow rate of approximately Y, and a fan peak speed corresponding to a fluid flow rate of approximately X;

(c) bypass valve means connected in parallel with said fan motor, operable to bypass said fan motor and being responsive to the need for cooling, said bypass valve means being capable of bypassing at least a major portion of X at a first relatively lower temperature and capable of substantially preventing bypass flow at a second relatively higher temperature;

(d) second flow control valve means having its inlet in fluid communication with said outlet port of said fan motor and with said bypass flow, said second flow control valve means having primary and secondary fluid outlets and being operable to communicate a fluid flow rate of approximately Z from said fluid inlet to said primary outlet over substantially the entire range of operating engine speeds and to communicate substantially all fluid flow in excess of Z from said inlet to said secondary outlet, Z being substantially less than X;

(e) an open-center steering gear mechanism having inlet and outlet ports, said inlet port being in fluid communication with said primary outlet of said second flow control valve means;

(f) said outlet port of said steering gear mechanism and said secondary outlet of said second flow control valve means being in fluid communication with said fluid inlet port of said pump.

2. A system as defined in claim 1 wherein fluid flow rates Y and Z are approximately equal.

3. A system as defined in claim 1 wherein said flow rate Z is in the range of about 2 gpm (7.5 lpm) and said flow rate X is in the range of about 6 gpm (23.5 lpm).

4. A vehicle engine accessory drive system comprising:

(a) an engine driven pump including a pumping element operable to deliver fluid at a rate generally proportional to engine speed, and fluid inlet and outlet ports, said pump having a fluid delivery rate of Y at engine idle, said pump comprising the sole source of pressurized fluid for said system and including first flow control valve means operable to limit the fluid delivery rate from said pump outlet port to a flow rate of X at higher engine speeds, X being substantially greater than Y;

(b) first and second subsystems connected in series flow relationship between said pump outlet port and said pump inlet port, each of said subsystems including inlet means and outlet means;

(c) one of said subsystems including:

(i) a hydraulic fan motor having an inlet port communicating with the subsystem inlet means and an outlet port communicating with the subsystem outlet means, said fan motor having a fan speed at engine idle corresponding to a fluid flow rate of approximately Y, and a fan peak speed corresponding to a fluid flow rate of approximately X;

(ii) bypass valve means connected in parallel with said fan motor, operable to bypass said fan motor and being responsive to the need for fan operation, said bypass valve means being capable of bypassing at least a major portion of X at a first relatively lower temperature condition and capable of substantially preventing bypass flow at a second relatively higher temperature condition;

(d) the other of said subsystems including:

(i) second flow control valve means having its inlet in fluid communication with the subsystem inlet means, said second flow control valve means having primary and secondary fluid outlets, being operable to communicate a fluid flow rate of approximately Z from its inlet to said primary fluid outlet over substantially the entire range of operating engine speeds and to communicate substantially all fluid flow in excess of Z from its inlet to said secondary fluid outlet, Z being substantially less than X;

(ii) said secondary fluid outlet being in fluid communication with the subsystem outlet means;

(iii) a steering gear mechanism having its inlet port connected to said primary fluid outlet and its outlet port connected to the subsystem outlet means.

5. A vehicle engine accessory drive system comprising:

(a) an engine driven pump defining fluid inlet and outlet ports and including a pumping element operable to discharge fluid at a rate generally proportional to engine speed, said pump having a fluid flow rate of Y at engine idle, and including first flow control valve means operable to limit the fluid flow rate from said pump outlet port to a flow rate of X at higher engine speeds, X being substantially greater than Y; said pump comprising the sole source of pressurized fluid for said system;

(b) second flow control valve means having its inlet in fluid communication with said pump outlet port and having primary and secondary fluid outlets, said second flow control valve means being operable to communicate a fluid flow rate of approximately Z from said fluid inlet to said primary outlet over substantially the entire range of operating engine speeds and to communicate substantially all fluid flow in excess of Z from said inlet to said secondary outlet, Z being substantially less than X;

(c) a steering gear mechanism having an inlet port in fluid communication with said primary fluid outlet, and an outlet port;

(d) a hydraulic fan motor having fluid inlet and outlet ports, said fluid inlet port being in fluid communication with said outlet port of said steering gear mechanism and with said secondary outlet of said steering gear flow control, said fan motor outlet port being in fluid communication with said pump inlet port, said fan motor having a fan speed at engine idle corresponding to a fluid flow rate of approximately Y, and a fan peak speed corresponding to a fluid flow rate of approximately X;

(e) bypass valve means connected in parallel with said fan motor, operable to bypass said fan motor and being responsive to the need for cooling, said bypass valve means being capable of bypassing at least a major portion of X at a first relatively lower temperature and capable of substantially preventing bypass flow at a second relatively higher temperature.

6. A system as defined in claim 4 or 5 wherein said fluid flow rates Y and Z are approximately equal.

7. A system as defined in claim 4 or 5 wherein said flow rate Z is in the range of about 2 gpm (7.5 lpm) and said flow rate X is in the range of about 6 gpm (23.5 lpm).

8. A system as defined in claim 1 or 4 or 5 wherein said hydraulic fan motor comprises a positive displacement rotary device defining expanding and contracting fluid volume chambers.

9. A system as defined in claim 4 or 5 wherein said steering gear mechanism is of the open-center type.

10. Motor-valve apparatus for use in a hydraulic fan drive system including a pump having fluid inlet and outlet ports and a pumping element operable to deliver fluid at a rate proportional to engine speed, the pump having a fluid delivery rate of Y at engine idle, the pump comprising the sole source of pressurized fluid for the system and including flow control valve means operable to limit the fluid delivery rate of the pump to X at higher engine speeds, X being substantially greater than Y, the system further including an open-center steering gear mechanism having inlet and outlet ports, the outlet port of the steering gear mechanism being in fluid communication with the inlet port of the pump, the steering gear mechanism being adapted to receive a fluid flow rate of Z over substantially the entire range of operating engine speeds, X being substantially greater than Z, said motor-valve apparatus comprising:

(a) housing means defining an inlet port, a primary outlet port for connection to the inlet port of the steering gear mechanism, and a secondary outlet port for connection to the inlet port of the pump;

(b) a positive displacement, fluid pressure actuated rotary device operably disposed within said housing means, said device being adapted to drive a fan, and defining expanding and contracting fluid chambers, said device having a displacement operable to provide a desired fan speed, at engine idle, corresponding to a fluid flow rate of approximately Y, and a peak fan speed corresponding to a fluid flow rate of approximately X;

(c) said housing means defining a fluid pressure port and a fluid return port communicating with said expanding and contracting fluid chambers respectively;

(d) said housing means defining an inlet passage, an outlet passage and a bypass passage communicating between said inlet and outlet passages, said inlet passage providing fluid communication between said inlet port and said pressure port, and said outlet passage providing fluid communication between said return port and said primary and secondary outlet ports;

(e) bypass valve means disposed in said inlet passage and being movable, in response to variations in a predetermined temperature condition, between a first position substantially preventing fluid communication from said inlet passage to said bypass passage at a relatively higher temperature, and a second position permitting fluid flow from said inlet passage to said bypass passage at a flow rate which is at least a major portion of X at a relatively lower temperature, the bypass flow through said bypass passage and the return flow through said return port being recombined;

(f) flow control valve means disposed in said outlet passage and being operable to maintain a fluid flow rate of Z from said outlet passage to said primary outlet port over substantially the entire range of operating engine speeds and to communicate substantially all fluid flow in excess of Z from said outlet passage to said secondary outlet port.

11. Apparatus as defined in claim 10 wherein said bypass valve means includes valve positioning means comprising a liquid-solid phase change material.

12. Apparatus as defined in claim 10 wherein said bypass valve means includes valve positioning means comprising an electromagnetic coil.

* * * * *